3,046,311
METHOD FOR PREPARING 1,5-PENTANEDIOLS

John G. Milligan, Austin, Tex., assignor to Jefferson Chemical Company, Inc., Houston, Tex., a corporation of Delaware
No Drawing. Filed July 10, 1958, Ser. No. 747,571
5 Claims. (Cl. 260—635)

This invention relates to 1,5-pentanediols, represented by the formula:

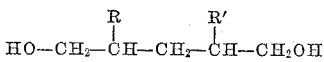

in which R and R' may represent hydrogen or a lower alkyl radical having from 1 to 3 carbon atoms. It also relates to the method for preparing these compounds and to 5-hydroxy-2-penten-1-als which are formed in an intermediate step in the preparation of the pentanediols.

The pentanedoils of this invention may be prepared by reacting or condensing a 2-buten-1-al, defined hereinbelow, with formaldehyde in contact with an alkaline condensing agent and in the presence of an inert solvent to form a reaction mixture comprising a 5-hydroxy-2-penten-1-al. This 5-hydroxy-2-penten-1-al is separated from the reaction mixture and hydrogenated to form the desired 1,5-pentanediol.

1,5-pentanediols are particularly useful as humectants, coupling agents, insect repellants and in the preparation of polyurethane foams and elastomers. They are also useful in the preparation of esters from monobasic fatty acids such as capric and caprylic acids. Such esters are good plasticizers and synthetic lubricants. Esters made with dicarboxylic acids are useful in synthetic resins.

2-buten-1-als, which may be employed to prepare the 1,5-pentanediols of this invention may be represented by the formula

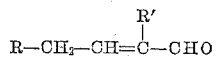

in which R and R' may represent hydrogen or a lower alkyl radical having from 1 to 3 carbon atoms. Typical compounds having this structure include 2-methyl-2-buten-1-al, 2-penten-1-al, 2-methyl-2-penten-1-al, 2-ethyl-2-penten-1-al, 2-buten-1-al and 2-methyl-2-hexen-1-al.

The first step in this process involves the condensation of formaldehyde with a 2-buten-1-al of the above formula. The formaldehyde may be employed as an aqueous or an organic solution of formaldehyde, an aqueous 37% formaldehyde solution being particularly convenient. Normally, the amount of formaldehyde employed is dependent on the amount of the 2-buten-1-al, the mol proportion of the formaldehyde to 2-buten-1-al being in the range of 0.5 to 1 to about 1.5 to 1, the lower ratios up to about 1 to 1 being preferred. It is important to conduct the condensation reaction within these ratios because reactions outside of these proportions have been observed to substantially reduce the yield of the 5-hydroxy-2-penten-1-als and to render the results of the process unsatisfactory.

The condensation reaction must be conducted under conditions providing a homogeneous reaction medium. Normally this is accomplished by conducting the reaction in the presence of an inert solvent which is effective to dissolve the reactants and thereby provide a homogeneous reaction medium. It is understood that the solvent employed will be inert to the reactants, to the products and to the alkali or alkaline condensing agent under the conditions of this reaction. Suitable solvents for this purpose include methyl alcohol, ethyl alcohol, isopropyl alcohol, dioxane, propylene glycol and the monoethyl ether of ethylene glycol.

The condensation reaction is ordinarily conducted at a moderately elevated temperature although temperatures in the range of 0° to about 100° C. may be employed. The preferred temperature range is from about 25° C. to about 65° C.

The condensing agents which may be employed in the first stage of this reaction are the alkaline reacting bases and salts, such as the hydroxides and carbonates of sodium and potassium. In general, the hydroxides and carbonates of the alkali metals, the hydroxides of the alkaline earth metals and strong soluble bases such as the quaternary ammonium hydroxides may be employed. Alkaline condensing agents which have been effectively employed include sodium hydroxide, sodium carbonate and potassium carbonate. Other suitable bases include calcium hydroxide, barium hydroxide and trimethylbenzylammonium hydroxide. The amount of the condensing agent employed does not appear to be critical and may range from 0.1% to 100% or more by weight of the alkyl-substituted 2-buten-1-al feed, the preferred range being from about 1% to 50% by weight.

Following the condensation step, the intermediate product, which is a 5-hydroxy-2-penten-1-al, is separated from the reaction product and subjected to hydrogenation at an elevated temperature to produce the 1,5-pentanediol. The conditions for effecting the hydrogenation are a temperature from about 100° C. to about 250° C. and a pressure from about 250 to about 5000 p.s.i.g. (pounds per square inch gauge). The 5-hydroxy-2-penten-1-al is also contacted with hydrogen in the presence of a hydrogenation catalyst during this reaction. Suitable hydrogenation catalysts include the metals and oxides of copper, nickel, cobalt, platinum, molybdenum and palladium.

In a typical operation, a 2-buten-1-al such as 2-methyl-2-penten-1-al is dissolved in an organic solvent, such as methyl alcohol. Formaldehyde, as a 37% aqueous solution, is added to the mixture of the 2-methyl-2-penten-1-al and methyl alcohol. This solution is agitated to effect a complete mixing of its components and the temperature of the solution is adjusted to about 60° C. These conditions are maintained while a predetermined amount of the alkaline condensing agent is added and until the reaction is substantially complete. Thereupon, the resulting mixture is subjected to distillation to remove the methyl alcohol overhead. After the solvent has been removed, the reaction product separates into two phases, i.e., an aqueous phase and an organic phase containing the intermediate product 2,4-dimethyl-5-hydroxy-2-penten-1-al. The organic phase is separated from the aqueous phase and the intermediate product is distilled from the organic phase in a cut boiling at 90° C. to 135° C. at 5 mm. of mercury pressure absolute. The 2,4-dimethyl-5-hydroxy-2-penten-1-al is then hydrogenated at an elevated temperature and pressure. Generally, this will be conducted at a temperature of 125–150° C. and at a pressure of about 2000 p.s.i.g. in contact with hydrogen and a metal hydrogenation catalyst. On completion of this step, the 2,4-dimethyl-1,5-pentanediol is readily recovered from the reaction products by distillation.

The following examples illustrate a specific embodiment of the practice of this invention:

Example I

A solution of 196 g. (2.0 mols) of 2-methyl-2-penten-1-al, 123 g. (1.5 mols) of 36.6% formaldehyde, and 225 ml. of methanol containing a few drops of phenolphthalein solution were placed in a flask fitted with a stirrer, thermometer, distilling column, and graduated dropping funnel. While the agitated solution was held at 60° C., 32 ml. of 5 normal sodium hydroxide (0.16 mol) were added over 56 minutes. The solution was held at 60° C. for another 20 minutes during which time the pink color from the phenolphthalein disappeared. The resulting mixture was then distilled until the distillate started to separate into two phases. A total of 267.5 g. of distillate, largely methanol, was collected. The residue separated into two layers. This was cooled to 25° C. and the lower aqueous layer was drawn off. The upper layer was washed with a 20 ml. portion of water. The aqueous solutions were then extracted in turn by two portions of 2-methyl-2-penten-1-al weighing 51 and 59 g. and these were added to the main organic layer. The combined organic solution was thereupon stripped of its 2-methyl-2-penten-1-al content by refluxing with 100 ml. of water into an oil trap. The remaining material was distilled to yield 99.3 g. fraction of crude 2,4-dimethyl-5-hydroxy-2-penten-1-al having a boiling range of 90–133° C./5 mm. (millimeters) of mercury pressure absolute (the bulk distilling at 108–115° C./5 mm.). This analyzed 83.5% by carbonyl analysis. A distillation residue of 28.3 g. was left in the flask. The yield of 2,4-dimethyl-5-hydroxy-2-penten-1-al in mol percent was 63% based on 2-methyl-2-penten-1-al consumed.

92.5 grams (0.59 mol) of 2,4-dimethyl-5-hydroxy-2-penten-1-al obtained in the same manner as that described above was hydrogenated by contacting it with hydrogen in the presence of 5 grams of Raney nickel and 90 milliliters of isopropanol. The hydrogenation was conducted at a pressure of 3000 p.s.i.g. for about 2 hours at 60° followed by one hour at 125°. Distillation of the products of the hydrogenation reaction resulted in the recovery of 76.4 grams (0.54 mol) of 2,4-dimethyl-1,5-pentanediol boiling in the range of 120°–131° C. at 5 mm. of mercury pressure absolute. On purification, the boiling point was 125–128° C./5 mm. This material is a liquid and is completely miscible with water.

The structure of the 2,4-dimethyl-1,5-pentanediol was established by heating 49 grams of this material with 1 gram of 85% phosphoric acid to form the cyclic ether 3,5-dimethyltetrahydropyran. This ether and the water produced distilled off as formed. During redistillation, the ether distilled at 126° C. On analysis of the 3,5-dimethyltetrahydropyran, 73.6% carbon and 12.09% hydrogen were found as compared to 73.6% carbon and 12.36% hydrogen content by theory.

*Example II*

Seventy grams (1.0 mol) crotonaldehyde was mixed with 81.8 g. (1.0 mol) of 36.6% formaldehyde. The mixture was homogeneous so no solvent was added. Three and one-half grams anhydrous potassium carbonate was added gradually over 1.3 hours with the reaction being cooled by an external water bath to absorb the heat of reaction and keep the temperature at 23 to 36° C. The mixture was then neutralized to litmus with 3.0 g. 90.8% formic acid. The resulting homogeneous solution was distilled and 12 grams of 4-methylolcrotonaldehyde recovered in a cut at 67–69° C. at 13 millimeters of mercury pressure absolute. On hydrogenation, this material yields 1,5-pentanediol.

Obviously, many modifications and variations of the invention as hereinbefore set forth may be made without departing from the spirit and scope thereof, and therefore only such limitations should be imposed as are indicated in the appended claims.

I claim:
1. A method for preparing a 1,5-pentanediol which comprises reacting a 2-buten-1-al with formaldehyde, the mol proportion of formaldehyde to 2-buten-1-al being in the range of about 0.5 to 1 to about 1 to 1, at a temperature within the range of about 0° to about 100° C. in contact with an alkaline condensing agent selected from the group consisting of the hydroxides and carbonates of the alkali metals to form a condensation product comprising a 5-hydroxy-2-penten-1-al, separating said 5-hydroxy-2-penten-1-al from said reaction mixture and hydrogenating said 5-hydroxy-2-penten-1-al to form a 1,5-pentanediol, said 2-buten-1-al having the formula:

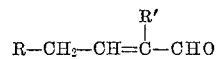

in which R and $R_2$ are selected from the group consisting of hydrogen and $C_1$ to $C_3$ alkyl groups.

2. A method as in claim 1 wherein the condensing agent is sodium hydroxide.
3. A method as in claim 1 wherein the condensing agent is potassium carbonate.
4. A method for preparing 2,4-dimethyl-1,5-pentanediol which comprises reacting 2-methyl-2-penten-1-al with from about 0.5 to about 1 mol of formaldehyde per mol of 2-methyl-2-penten-1-al in contact with sodium hydroxide in solution in an inert solvent at a temperature within the range of about 0° to about 100° C. to form a condensation product comprising 2,4-dimethyl-5-hydroxy-2-penten-1-al, separating said 2,4-dimethyl-5-hydroxy-2-penten-1-al from said reaction product and hydrogenating said 2,4-dimethyl-5-hydroxy-2-penten-1-al to form 2,4-dimethyl-1,5-pentanediol.
5. A method for preparing 1,5-pentanediol which comprises reacting crotonaldehyde with from about 0.5 to about 1 mol of formaldehyde per mol of crotonaldehyde at a temperature within the range of from about 0° to about 100° C. in contact with potassium carbonate to form a condensation product comprising 4-methylol crotonaldehyde, separating said 4-methylol crotonaldehyde from said reaction product and hydrogenating said 4-methylol crotonaldehyde to form 1,5-pentanediol.

References Cited in the file of this patent

UNITED STATES PATENTS

| 2,317,456 | Hanford et al. | Apr. 27, 1943 |
| 2,418,290 | Bruson et al. | Apr. 1, 1947 |

FOREIGN PATENTS

| 409,308 | Italy | Feb. 10, 1945 |

OTHER REFERENCES

Groggins: Unit Processes in Org. Synthesis, 1952, pp. 490–1. (Copy in Library.)

Noller et al.: Chem. Ab., vol. 50 (1956), pp. 2582–3.